United States Patent
Sundstrom

(10) Patent No.: US 7,698,687 B2
(45) Date of Patent: Apr. 13, 2010

(54) DETERMINING USABILITY OF A CODED FILE FOR AN APPLICATION

(75) Inventor: Henrik Sundstrom, Sodra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 175 days.

(21) Appl. No.: 10/525,270

(22) PCT Filed: Aug. 25, 2003

(86) PCT No.: PCT/EP03/09395
§ 371 (c)(1),
(2), (4) Date: Nov. 7, 2005

(87) PCT Pub. No.: WO2004/021283
PCT Pub. Date: Mar. 11, 2004

(65) Prior Publication Data
US 2006/0167840 A1    Jul. 27, 2006

Related U.S. Application Data

(60) Provisional application No. 60/407,892, filed on Sep. 3, 2002.

(30) Foreign Application Priority Data

Aug. 27, 2002 (EP) ................... 02019211

(51) Int. Cl.
*G06F 9/44* (2006.01)
*G06F 15/16* (2006.01)
*H04W 4/00* (2009.01)

(52) U.S. Cl. .............. 717/126; 455/426.1; 709/206; 709/246

(58) Field of Classification Search .............. None
See application file for complete search history.

(56) References Cited

U.S. PATENT DOCUMENTS 5,548,084 A * 8/1996 Tracy ................... 174/381

(Continued)

FOREIGN PATENT DOCUMENTS

EP    0 311 807    4/1989

(Continued)

OTHER PUBLICATIONS

Matt Keveney, How I made these animations, 2001, pp. 1-5. Retrieved from <http://www.keveney.com/howto.html>.*

(Continued)

*Primary Examiner*—Tuan Q Dam
*Assistant Examiner*—Hanh T Bui
(74) *Attorney, Agent, or Firm*—Myers Bigel Sibley & Sajovec

(57) ABSTRACT

An electronic device for determining usability of a coded file in an application includes at least one file matching unit associated with an application, which receives at least one property of a code file, matches the property against the application, generates an indication indicating if the file can be used in the application or not based on the matching, and associates the indication with the coded file for later enabling a decision about use of the file in the application.

16 Claims, 3 Drawing Sheets

U.S. PATENT DOCUMENTS

| | | | |
|---|---|---|---|
| 5,668,960 A | 9/1997 | Kataoka | |
| 5,745,909 A | 4/1998 | Perlman et al. | 707/513 |
| 7,380,093 B2* | 5/2008 | Shimazaki et al. | 711/171 |
| 7,551,941 B2* | 6/2009 | Makela | 455/552.1 |
| 2002/0110230 A1* | 8/2002 | Leuca et al. | 379/201.01 |
| 2003/0026596 A1* | 2/2003 | Betti et al. | 386/109 |
| 2003/0096581 A1* | 5/2003 | Takamine | 455/84 |
| 2006/0041518 A1* | 2/2006 | Blair et al. | 705/80 |

FOREIGN PATENT DOCUMENTS

| | | |
|---|---|---|
| EP | 311807 A2 * | 4/1989 |
| WO | 01/35622 | 5/2001 |
| WO | 01/59706 | 8/2001 |
| WO | WO 02/44906 | 6/2002 |

OTHER PUBLICATIONS

English translation of Official Action from the Patent Office of the Russian Federation for Application No. 2005108600.

* cited by examiner

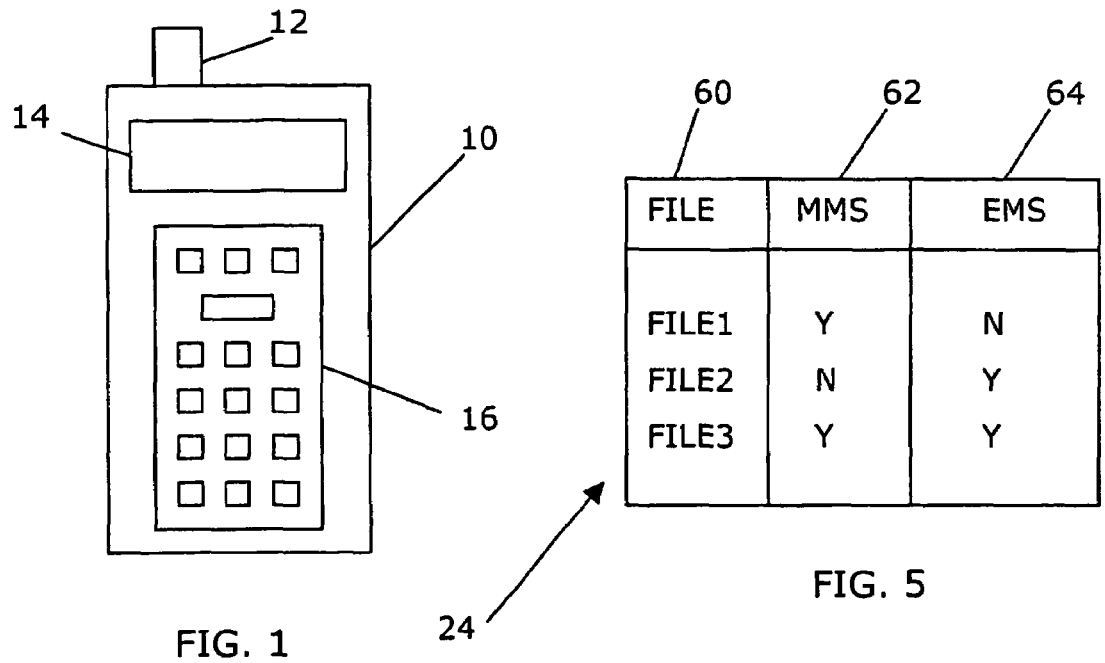
FIG. 1
FIG. 5
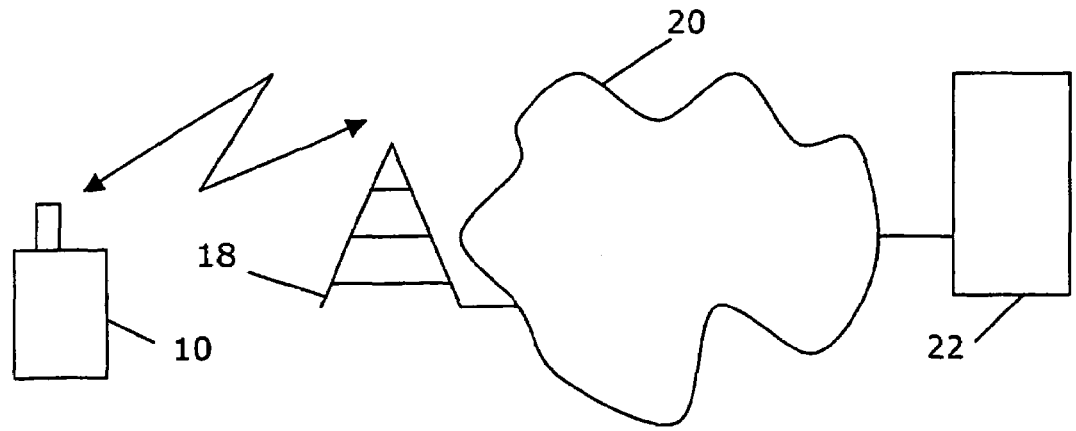
FIG. 2
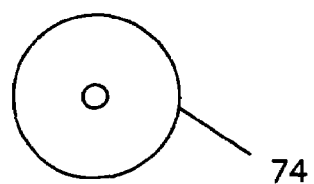
FIG. 7

DETERMINING USABILITY OF A CODED FILE FOR AN APPLICATION

RELATED APPLICATIONS

The present application is a 35 U.S.C. 371 national phase application of PCT International Application No. PCT/EP03/009395, having an international filing date of Aug. 25, 2003 and claiming priority to European Patent Application No. 02019211.8, filed Aug. 27, 2002, and U.S. Provisional Application No. 60/407,892 filed Sep. 3, 2002, the disclosures of which are incorporated herein by reference in their entireties. The above PCT International Application was published in the English language and has International Publication No. WO 04/021283.

TECHNICAL FIELD OF THE INVENTION

The present invention relates to the field of computer communication and telecommunication. More particularly the present invention relates to a method and an electronic device for determining usability of a coded file in an application for enabling faster decisions about using the file in the application as well as a computer readable medium including program code for performing said method and a computer program element including such code.

DESCRIPTION OF RELATED ART

It is known within the field of computers and wireless communication to send different types of messages including coded files, like e-mail, MMS (Multimedia Messaging) and EMS (Enhanced Short Message Service or Enhanced SMS). The coded files can for example be video-files, pictures (still and moving) as well as sound files.

Such files can be downloaded and saved in portable electronic equipment such as mobile phones or different types of stationary or portable computers. It is also possible to generate such files locally in the device itself. An MMS file is a multimedia file, which is not a coded file in itself. It can however contain different types of media files, which are normally coded with some type of coding algorithm.

When using an application like MMS or EMS, it is today not possible to directly see if a coded file can be used in the application, as for instance to be sent in an MMS message without opening the file and decoding it. This decoding takes up time and resources in the electronic device in case files that cannot be used by the application have to be decoded in order to find out that it is not suitable each time the application is to use the file.

It is known to include information about a file in the header of the file. For example EP1052598 describes a mobile terminal that can receive images and a document containing image information associated with the images from a server. This allows a user to identify the image. The image information is described as being the storage location of the image. The document also describes resizing an image in the mobile terminal for use as background.

WO 01/35622 describes an MMS-system, where messages of different media types can be sent to a mobile communication device from a system. The system can sort messages and filter these according to user's profile/preferences/usage based on urgency, topic, sender etc.

WO 01/86986 describes downloading of multimedia data from a network or the Internet to a mobile phone. Information of type of media of a multimedia file is included in the header of the multimedia file. This information in the header includes information on the length of the multimedia file, as well as information on the types of media files included in the multimedia file.

The documents describe terminals and devices where coded files are already used in applications and not their applicability before being used in an application.

None of the described documents thus describe anything that can be used in order to quicken up selection of a coded file for use in an application in order to save time. There is thus a need for a solution that makes it possible to instantly know which coded files can be used in an application when trying to use such files in said application.

SUMMARY OF THE INVENTION

When a coded file is to be used in an application, like MMS, there is a problem of knowing if the file can be used or not without decoding the file.

The present invention is directed towards solving the problem of enabling faster selection of coded files to be used in an application without having to decode a file each time it is to be used.

This is achieved by obtaining at least one property of the file, matching the property against an application, generating an indication if the file can be used in the application and associating the coded file with the indication.

One object of the present invention is to provide a method, which enables faster selection of coded files to be used in an application without having to decode the file each time it is selected.

According to a first aspect of the present invention, the object is achieved by a method of determining usability of a coded file in an application including the steps of: obtaining at least one property of the coded file, matching the property against at least one application where the file could be used, generating an indication indicating if the file can be used in the application or not based on the matching, and associating the indication with the coded file for later enabling of fast decision about use of the file in the application.

A second aspect of the present invention is directed to a method including the features of the first aspect and further including matching of more than one property against each application and generating a flag indicating that the file can be used if all matched properties of the coded file can be used in the application.

A third aspect of the present invention is directed towards a method including the features of the first aspect, wherein the file is an image file.

A fourth aspect of the present invention is directed towards a method including the features of the first aspect, wherein the file is a sound file.

A fifth aspect of the present invention is directed towards a method including the features of the first aspect, and further comprising the step of checking the indication before using the file in an application associated with the indication.

A sixth aspect of the present invention is directed towards a method including the features of the first aspect, wherein the properties are obtained through decoding the coded file.

Another object of the present invention is to provide an electronic device, which enables faster selection of coded files to be used in an application without having to decode a file each time it is selected.

According to a seventh aspect of the present invention, this object is achieved by an electronic device for determining usability of a coded file in an application comprising: at least one file matching unit associated with an application and arranged to receive at least one property of a coded file, match the property against the application, generate an indication indicating if the file can be used in the application or not based on the matching, and associate the indication with the coded file for later enabling fast decision about use of the file in the application.

An eighth aspect of the present invention is directed towards an electronic device including the features of the seventh aspect and further including a file property extractor for obtaining said at least one property of the coded file.

A ninth aspect of the present invention is directed towards an electronic device including the features of the eighth aspect, wherein the file property extractor is further arranged to extract more than one property of the file and the file matching unit is arranged to match all extracted properties relevant to the application.

A tenth aspect of the present invention is directed towards an electronic device including the features of the eight aspect, wherein the file property extractor is further arranged to store the property after extraction.

An eleventh aspect of the present invention is directed towards an electronic device including the features of the eighth aspect, wherein the file property extractor is a file decoder.

A twelfth aspect of the present invention is directed towards an electronic device including the features of the seventh aspect and further including an application unit arranged to check the corresponding indication before using said coded file.

A thirteenth aspect of the present invention is directed towards an electronic device including the features of the seventh aspect, wherein there is more than one file matching unit and each such unit is associated with a corresponding application.

A fourteenth aspect of the present invention is directed towards an electronic device including the features of the seventh aspect, wherein the device is a portable communication device.

A fifteenth aspect of the present invention is directed towards an electronic device including the features of the fourteenth aspect, wherein the device is a cellular phone.

Yet another object is to provide a program product, which enables faster selection of coded files to be used in an application without having to decode the file each time it is selected.

According to a sixteenth aspect of the invention this object is achieved by a computer program product comprising a computer readable medium, having thereon: computer program code, to make a computer or an electronic device execute, when said program is loaded in the computer or the electronic device: obtaining of at least one property of the coded file, matching of the property against at least one application where the file could be used, generation of an indication indicating if the file can be used in the application or not based on the matching, and association of the indication with the coded file for later enabling of fast decision about use of the file in the application.

Yet another object is to provide a computer program element, which enables faster selection of coded files to be used in an application without having to decode the file each time it is selected.

According to a seventeenth aspect of the invention, this object is achieved by a computer program element comprising: computer program code to make a computer or an electronic device execute: obtaining of at least one property of the coded file, matching of the property against at least one application where the file could be used, generation of an indication indicating if the file can be used in the application or not based on the matching and association of the indication with the coded file for later enabling of fast decision about use of the file in the application.

The invention has the following advantages. With the generation of indications and association to a file it is possible to later use this information for speedier use of files in the different applications. If for instance a user of an MMS application wants to send an MMS message to a server and include a coded file, the MMS application might only allow the user of the apparatus to see the files having an associated indication, which makes it easier and faster to generate an MMS message. The application would then not need to have a file decoded by a decoder or the properties extracted before knowing if it can use the file or not. It just checks the indication and then it knows whether it can use the file or not. With the present invention it is also possible to check a large set of files quickly concerning if they are applicable or not. Because an associated indication is checked instead of performing a complete decoding, less system resources are used than when decoding. This can be crucial for a memory consuming application.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 1 shows an electronic device in the form of a cellular phone,

FIG. 2 shows the phone in FIG. 1 connected to a server via a cellular network,

FIG. 5 shows a table with a number of files tagged with information indicating their applicability for two different applications, FIG. 7 shows a CD Rom on which program code for executing the method according to the invention is provided.

DETAILED DESCRIPTION OF EMBODIMENTS

Figure 3:
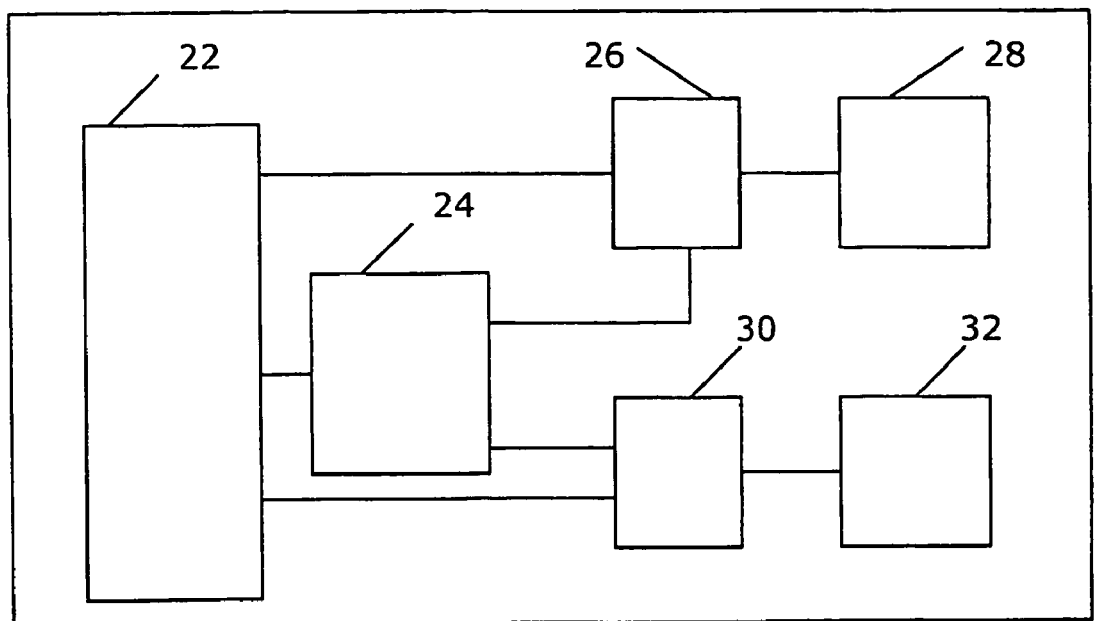
FIG. 3 shows a block schematic of the parts relevant to the invention in the interior of the phone in FIG. 1.

An electronic equipment or device 10 according to the invention is shown in FIG. 1. In the preferred embodiment the device is a cellular phone 10 having an antenna 12, a display 14 and a keypad 16 including a number of keys. Apart from making and receiving telephone calls, the keypad 16 is used for entering information such as selection of functions and responding to prompts and the display 14 is used for displaying functions and prompts to a user of the phone. The antenna 12 is used for communication with other users via a network. A cellular phone is just one example of a device in which the invention can be implemented. The invention can for instance also be used in a PDA (personal digital assistant), a palm top computer, a lap top computer and even on a regular stationary computer such as a PC (personal computer).

FIG. 2 shows the cellular phone 10 connected to a cellular network 20 via a base station 18 for communication with a server 22 also connected to the network 20. The network is normally a GSM-type of network or a GPRS network. It is of course also possible that the network is WCDMA network. The server 22 is a server, which can receive MMS (Multimedia Messaging) and/or EMS (Enhanced SMS) messages. It should be realised that the phone 10 could just as well communicate with another phone, a PDA or a computer via the network. The server 22 can also be directly connected to the cellular network 20, or be connected to it via some other network. The network does of course not have to be a cellular network but can be some other type of network, such as Internet, a corporate intranet, a LAN or a wireless LAN. It can also be a so-called PSTN (Public Switched Telephone Network). This figure has been enclosed for showing an environment in which the invention can be provided. It should however be realised that the application need not require communication with other devices, in which case the connection via a network might not be necessary.

FIG. 3 shows part of the interior of the cellular phone that is relevant for the present invention. The phone 10 includes a file property extractor 22, which in the preferred embodiment is a decoder for coded files. Examples of such decoders are JPEG decoders for JPEG files. In the following the example of how the invention functions will be described with reference made to JPEG, although the invention is in no way limited to this type of file or its decoder. To the decoder 22 is connected a file store 24 in which different files are stored. The decoder 22 is connected to a first file matching unit 26, which in turn is connected to a first application unit 28 which handles an MMS application. The decoder 22 is also connected to a second file matching unit 30, which in turn is connected to a second application unit 32, which handles an EMS application. The two file matching units 26, 30 are connected to the file store 24.

Figure 4:
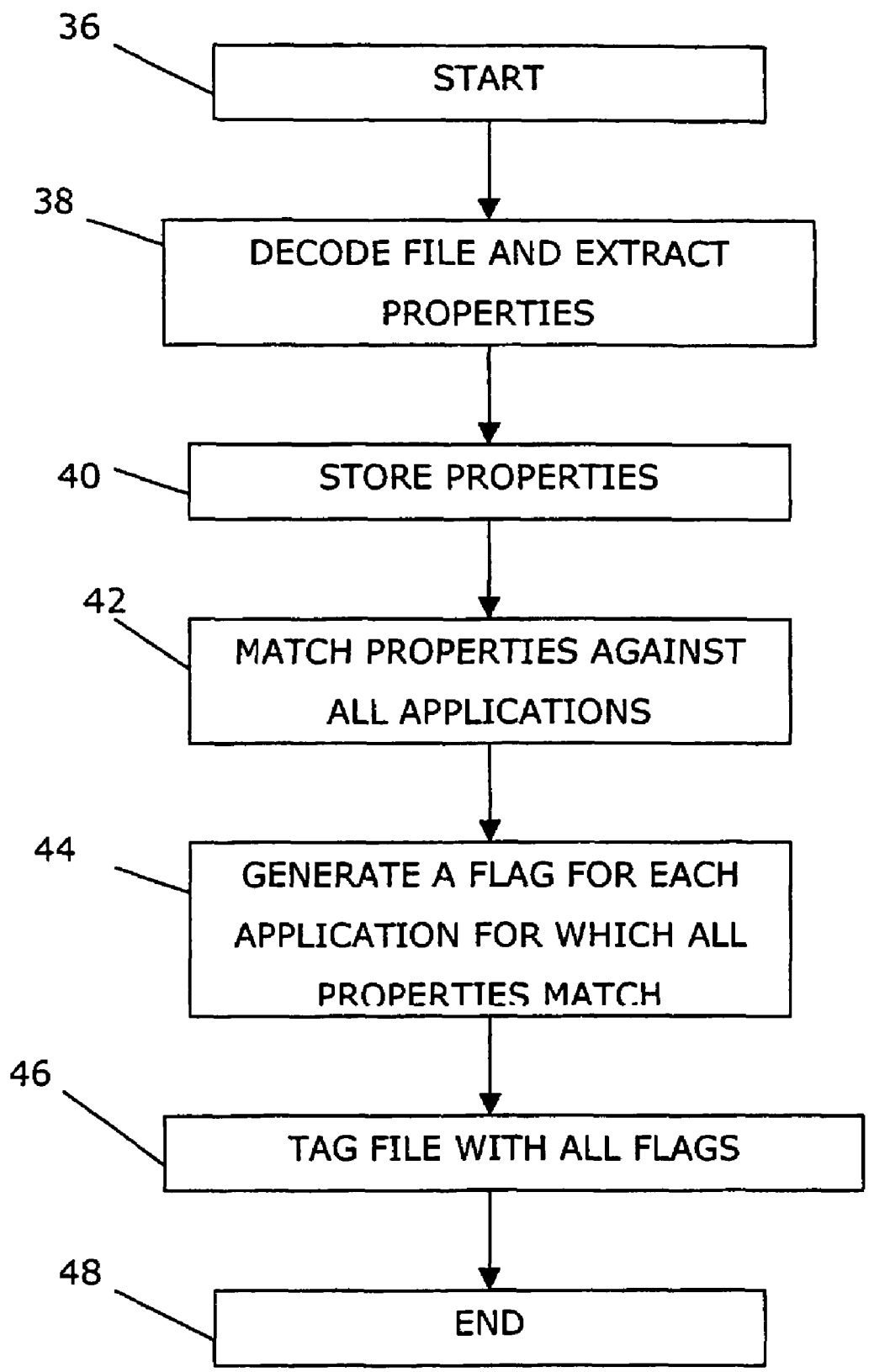
FIG. 4 shows a flow chart of a method of performing the method according to a preferred embodiment of the invention.

FIG. 4 shows a flow chart of the method according to the invention.

FIG. 5 shows the file store 24 containing three columns file, 60, MMS 62 and EMS 64, where tags for the applications MMS and EMS have been added to three files, file1, file2 and file3. The presence of a tag is indicated with a Y for yes and no tag is indicated with an N for no.

A preferred embodiment of the present invention will now be explained with reference to FIGS. 3, 4 and 5. This embodiment is also believed to be the best mode of the invention at the moment. The mobile phone 10 has a number of coded files in the file store 24. In FIG. 5 there is shown three such files, where a first file file1 is a JPEG-file, a second file file2 is a GIF-file and a third file file3 is an MPEG file. These files could have been placed in the store in several different ways. They could have been downloaded via a WAP or Internet browser, received via e-mail, MMS or EMS, downloaded some other way, been generated locally in the phone or provided in the phone beforehand. The method of the invention starts by the decoder 22 retrieving a file, file1, from the file store, since it is a JPEG file, step 36. The file is then decoded in the decoder 22 and in the process of decoding the file different properties are extracted, step 38. The properties are then stored in the file store 24 in an area associated with the file, step 40. For a JPEG-file these properties can be colour depth, width of the picture, height of the picture, information about if the image includes animation and type of coding, although other properties are also feasible. The different properties are then forwarded from the decoder 22 to both the first and the second file matching units 26, 30. In the first and second file matching units 26, 30 the properties are matched against the requirements in the MMS application and the EMS application, step 42. This means that all relevant properties are checked against the capability of the application in question. The two file matching units generate indications and in this preferred embodiment flags if all the selected properties are matched, step 44, and thereafter the two file matching units associates or tags the file with the flags generated or associates the files with the flags, if there are any, step 46. Thereafter the method ends, step 48.

Figure 6:
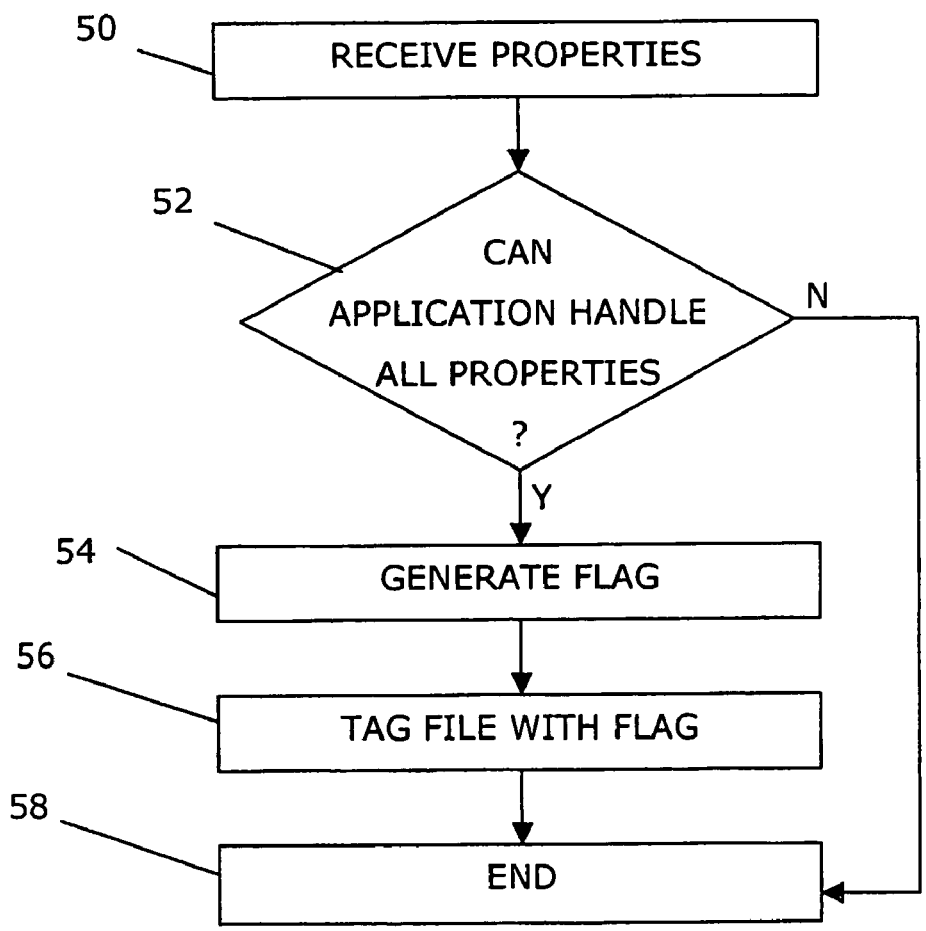
FIG. 6 shows a flow chart of some parts of the method according to the invention in more detail.

FIG. 6 shows a flow chart, which shows in more detail how the matching and tagging is done in a file matching unit. First the properties are received from the decoder, step 50. If all the properties can be handled by the application unit, step 52, a flag is generated, step 54. Matching can be done in the following way. For instance, if the colour depth is matched in the first file matching unit 26, i.e. if the file is a colour picture, in which the depth can be of 256 different colours, this is matched to the abilities of the MMS application to include colours. In the same way the other properties are checked, like width and height of the picture as well as format of the file, i.e. JPEG in the example given. Another possible property is if the image contains animations. In the present case all of the properties of the file file1 were being matched or could be handled by the application and the column 62 of the file store receives a Y for the MMS application from the first file matching unit. Thus a flag is generated if all the properties are matched, step 54, and also tagged to the file in question, step 56. Thereafter the method is ended, step 58. If the application could not handle all properties, step 52, no flag is generated and the method is ended, step 58. This can be exemplified by the second file matching unit 30, which has also received the properties from the decoder. In the example given above, the file file1 was a colour image and therefore the EMS application cannot handle the file, since it only handles black and white images, i.e. images with a colour depth of 1. Therefore this application cannot generate a flag, which is indicated in column 62 of the file store with an N.

The file store 24 includes two more coded files for which the same process has been run, so that file2 can be used in both the applications, while file3 cannot be used in any.

With this tagging of files it is possible to later use this information for speedier use of files in the different applications. When for instance a user of the MMS application later wants to send an MMS message, for instance to server 22, and include a coded file, the MMS application might only allow the user of the apparatus to see the files having a tag, which makes it easier and faster to generate an MMS message. The application would then not need to have a file decoded by a decoder or the properties extracted before knowing if it can use the file or not. It just checks the flag and then it knows whether it can use the file or not.

With the present invention it is also possible to check a large set of files quickly concerning if they are applicable or not. Because a tag is checked instead of performing a complete decoding, less system resources are also used than when decoding. This can be crucial for a memory consuming application.

It should be realised that there might be more decoders present than what is shown in FIG. 3. In this case all the decoders are connected to all file matching units as well as to the file store in order to be able to generate flags for all applications. In the same way it is possible to have more applications than what has been described here. In this case each application will have its own file matching unit connected both to the application unit as well as to all decoders and the file store. The applications are also not limited to message sending related applications like MMS or EMS. Examples of other possible applications are web or WAP browsers, and document handling applications. Other examples are an image editor putting a limitation on image size or a MIDI music editor that puts a limitation on the number of tracks it supports. The invention is generally possible to use with any application that accepts an encoded file and puts limitations on the allowed input files The file property extractor need not be a complete decoder, but other suitable means are possible. What is important is that the properties can be extracted from the coded file, which might not be necessary through decoding the whole file. It might for instance be sufficient to only extract the information in the header of the file.

The indications were here provided in the form of flags, i.e. a bit having a value of 1 if the properties can be handled by the application and no bit, i.e. a zero, if it cannot be handled. There are of course many possible variations to this, even though a flag is the easiest and perhaps best way to indicate the applicability of a coded file. Other examples are a string, an integer value or even composite data types. With these indications all relevant properties can be made visible to an application without decoding. The flags are in the preferred embodiment provided in an area directly associated with the file in the file store. They need not necessarily be provided there, they can for instance also be provided in the coded file itself or in a separate table or database. A positive flag or a bit indicating applicability was here used for indicating that a file could be used in an application. A negative flag, i.e. a bit indicating that the file cannot be used in the application, could just as well be used instead.

It is furthermore not necessary to forward all properties to a file matching unit. Only those properties that are relevant to the application need be forwarded.

The example given above was of a coded image file of the JPEG format. The invention is equally as well applicable for other types of image files as well as for other types of coded files such as different type of sound files, like for instance Wav-files.

According to the invention the obtained properties of a coded file were stored for later use in addition to the storing of the flag. Because of this storing of the properties a new flag can be generated more easily if a new application is downloaded into the phone. For some applications steps 38 and 40 of FIG. 4 could then be a bit different. Then the already extracted properties would be fetched from an area of the file store by a file matching unit without decoding, before properties are matched against an application. The step of storing might also be omitted from the method, but then the properties would have to be extracted each time a new application would need a flag. The properties need not be stored in the file store either, but can be stored in any suitable memory location.

The file matching unit does also not need to be a separate unit, but can be included as part of the application unit.

The present invention has been described in relation to an apparatus having file matching units. These and other parts of the invention, like at least part of the file property extractors, can also be provided in the form of one or more processors with corresponding program memories containing suitable software code. The software for performing the method can also be provided on a computer readable medium like a disc 74 of the CD ROM type as depicted in FIG. 7 or on some other type. In this case the software for performing the method when loaded into the phone or a computer will be provided on this disc. The program code can also be downloaded remotely from a server either outside or inside the cellular network or be downloaded via a computer like a PC to which the phone is temporarily connected.

The phone in this description uses radio circuits in order to communicate with other devices. These radio circuits have however not been described here since they are not really part of the invention and since this communication is performed in a way already known within the art.

The invention claimed is:

1. A method of determining usability of a coded file in an application, the method including:

obtaining at least one property of the coded file, wherein the at least one property comprises properties other than an application type or file format including at least one of color depth, width of picture, height of picture and/or animation information;

matching the property including at least one of color depth, width of picture, height of picture and/or animation against limitations of at least one application where the coded file could be used, wherein the application uses a certain application type of file but has limitations regarding the properties of the type of file;

generating an indication indicating whether or not the coded file can be used in the application based on the matching; and associating the indication with the coded file for later enabling of a decision about use of the coded file in the application.

2. A method according to claim 1, wherein the at least one property is more than one property and the more than one property is matched against each application, the method comprising generating a flag indicating that the coded file can be used if all matched properties of the coded file can be used in the application.

3. A method according to claim 1, wherein the coded file is an image file.

4. A method according to claim 1, wherein the coded file is a sound file.

5. A method according to claim 1, further comprising checking the indication before using the coded file in an application associated with the indication.

6. A method according to claim 1, wherein the properties are obtained through decoding the coded file.

7. An electronic device for determining usability of a coded file in an application comprising:

a processor comprising at least one file matching unit associated with an application and configured to receive at least one property of the coded file, wherein the at least one property comprises properties other than an application type or file format including at least one of color depth, width of picture, height of picture and/or animation information, to match the property including at least one of color depth, width of picture, height of picture and/or animation information against limitations of the application, wherein the application uses a certain application type of file but has limitations regarding the properties of the type of file, to generate an indication indicating whether or not the coded file can be used in the application based on the matching, and to associate the indication with the coded file for later enabling a decision about use of the coded file in the application.

8. An electronic device according to claim 7, further comprising a file property extractor for obtaining the at least one property of the coded file.

9. An electronic device according to claim 8, wherein the coded file property extractor is arranged to extract more than one property of the coded file and the coded file matching unit is arranged to match all extracted properties relevant to the application.

10. An electronic device according to claim 8, wherein the coded file property extractor is arranged to store the property after extraction.

11. An electronic device according to claim 8, wherein the coded file property extractor is a file decoder.

12. An electronic device according to claim 7, further comprising an application unit arranged to check the corresponding indication before using the coded file.

13. An electronic device according to claim 7, wherein the coded file matching unit is more than one file matching unit and each matching unit is associated with a corresponding application.

14. An electronic device according to claim 7, wherein the device is a portable communication device.

15. An electronic device according to claim 14, wherein the device is a cellular phone.

16. A computer program product for determining usability of a coded file, the computer program product comprising program code embodied in a computer-readable storage medium, the computer program code comprising: computer program code configured to obtain at least one property of the coded file, wherein the at least one property comprises properties other than an application type or file format including at least one of color depth, width of picture, height of picture and/or animation information, computer program code configured to match the property including at least one of color depth, width of picture, height of picture and/or animation information against limitations of at least one application where the coded file could be used, wherein the application uses a certain application type of file but has limitations regarding the properties of the type of file, computer program code configured to generate an indication indicating whether or not the coded file can be used in the application based on the matching, and computer program code configured to associate the indication with the coded file for later enabling a decision about use of the coded file in the application.

* * * * *